(12) United States Patent
Tamoto et al.

(10) Patent No.: US 9,695,885 B2
(45) Date of Patent: Jul. 4, 2017

(54) AUXILIARY DRIVE WHEEL-SIDE DIFFERENTIAL UNIT FOR FOUR-WHEEL DRIVE VEHICLE

(71) Applicant: Toyota Jidosha Kabushiki Kaisha, Toyota-shi, Aichi-ken (JP)

(72) Inventors: Hideki Tamoto, Toyota (JP); Takahiro Yoshimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 148 days.

(21) Appl. No.: 14/575,128

(22) Filed: Dec. 18, 2014

(65) Prior Publication Data

US 2015/0165901 A1 Jun. 18, 2015

(30) Foreign Application Priority Data

Dec. 18, 2013 (JP) .................................. 2013-261873
Dec. 1, 2014 (JP) .................................. 2014-243564

(51) Int. Cl.
| | |
|---|---|
| *B60K 17/346* | (2006.01) |
| *F16D 27/118* | (2006.01) |
| *B60K 23/08* | (2006.01) |
| *F16D 11/00* | (2006.01) |
| *F16D 23/12* | (2006.01) |

(52) U.S. Cl.
CPC ........ *F16D 27/118* (2013.01); *B60K 17/3462* (2013.01); *B60K 23/0808* (2013.01); *F16D 2011/004* (2013.01); *F16D 2023/123* (2013.01)

(58) Field of Classification Search
CPC ............ B60K 17/3462; B60K 23/0808; F16H 2057/02052; F16D 2011/002; F16D 2011/004; F16D 27/118
See application file for complete search history.

(56) References Cited

U.S. PATENT DOCUMENTS 8,469,854 B1 * 6/2013 Downs .................. B60K 23/08
475/221
8,535,194 B2 * 9/2013 Juenemann .......... B60K 17/348
180/249

FOREIGN PATENT DOCUMENTS

| | | |
|---|---|---|
| JP | 61-117948 U | 7/1986 |
| JP | 2002-031210 A | 1/2002 |
| JP | 2002-370557 A | 12/2002 |
| WO | 2010/019641 A2 | 2/2010 |

* cited by examiner

Primary Examiner — Erin D Bishop
(74) Attorney, Agent, or Firm — Dinsmore & Shohl LLP (57) ABSTRACT

A movable sleeve of a second clutch is provided between a cylindrical ring gear and a cylindrical shaft of a differential case of a differential gear unit. In a disconnect mode in which a propeller shaft is disconnected from rear wheels, the cylindrical ring gear is disconnected from the differential case by the movable sleeve of the second clutch. Thus, in the disconnect mode, a fully differential state of the differential gear unit is prevented.

5 Claims, 5 Drawing Sheets

AUXILIARY DRIVE WHEEL-SIDE DIFFERENTIAL UNIT FOR FOUR-WHEEL DRIVE VEHICLE

INCORPORATION BY REFERENCE

The disclosure of Japanese Patent Application No. 2013-261873 filed on Dec. 18, 2013 including the specification, drawings and abstract is incorporated herein by reference in its entirety.

BACKGROUND OF THE INVENTION

1. Field of the Invention

The invention relates to, in an auxiliary drive wheel-side differential unit for a four-wheel drive vehicle that includes a power transmission member configured to transmit driving force from a driving source to auxiliary drive wheels in a four-wheel drive mode and that disconnects the power transmission member from the auxiliary drive wheels in a two-wheel drive mode, a technique for preventing a fully differential state of a differential gear unit provided in the auxiliary drive wheel-side differential unit when the power transmission member is disconnected from the auxiliary drive wheels.

2. Description of Related Art

There is known a four-wheel drive vehicle in which a two-wheel drive mode or a four-wheel drive mode is selectively carried out. In the two-wheel drive mode, driving force is transmitted from a driving source to right and left main drive wheels. In the four-wheel drive mode, driving force is transmitted from the driving source to the right and left main drive wheels and the right and left auxiliary drive wheels. In the four-wheel drive vehicle, there is known an auxiliary drive wheel-side differential unit for a four-wheel drive vehicle configured to disconnect a power transmission member from the auxiliary drive wheels in the two-wheel drive mode. The power transmission member transmits driving force to the auxiliary drive wheels in the four-wheel drive mode. This is, for example, an auxiliary drive wheel-side differential unit for a four-wheel drive vehicle, described in International Application Publication No. 2010/019641.

In the auxiliary drive wheel-side differential unit for a four-wheel drive vehicle, described in International Application Publication No. 2010/019641, a control coupling (multi-disc clutch) is provided in an axle between a differential gear unit and one of right and left auxiliary drive wheels. In a two-wheel drive mode, the differential gear unit is disconnected from the one of the right and left auxiliary drive wheels by the control coupling, with the result that a power transmission member, such as a propeller shaft, that transmits driving force from a driving source to the auxiliary drive wheels in a four-wheel drive mode is disconnected from the auxiliary drive wheels.

SUMMARY OF THE INVENTION

In the above-described auxiliary drive wheel-side differential unit for a four-wheel drive vehicle, when the power transmission member is disconnected from the auxiliary drive wheels, the differential gear unit is disconnected from the one of the auxiliary drive wheels by the control coupling. Disconnecting the power transmission member from the auxiliary drive wheels may be referred to as "disconnect". Thus, there is an inconvenience that the differential gear unit that couples the axle, on which the control coupling is provided, is placed in a fully differential state during traveling for a long period of time. In the fully differential state, rotation of a ring gear that rotates together with a differential case of the differential gear unit is placed in a stopped state, and differential rotation of a pair of side gears becomes maximum in the differential gear unit. The differential gear unit does not include a lubricating structure that assumes the fully differential state. Thus, if such a fully differential state continues, there is a possibility that lubricating oil that lubricates the gears, such as the pair of side gears and a pair of pinions, of the differential gear unit becomes insufficient because of rotation of the ring gear.

The invention provides an auxiliary drive wheel-side differential unit for a four-wheel drive vehicle, which prevents a fully differential state of a differential gear unit in a disconnect mode.

A first aspect of the invention provides an auxiliary drive wheel-side differential unit for a four-wheel drive vehicle. The four-wheel drive vehicle includes a driving source, main drive wheels, and auxiliary drive wheels. The auxiliary drive wheel-side differential unit includes a cylindrical ring gear, a differential gear unit, an intermeshing disconnect mechanism, and an actuator. The cylindrical ring gear supported so as to rotate around a rotation axis of the cylindrical ring gear. The cylindrical ring gear is configured such that driving force is input to the cylindrical ring gear in a four-wheel drive mode. The four-wheel drive mode is a mode in which driving force is transmitted from the driving source to the main drive wheels and the auxiliary drive wheels. The differential gear unit includes a differential case. The differential gear unit is configured to distribute power to the auxiliary drive wheels. The power is transmitted to the differential case. The differential case has a cylindrical shaft concentric with the cylindrical ring gear. The cylindrical shaft protrudes toward a radially inner side of the cylindrical ring gear. A part of the intermeshing disconnect mechanism is provided between the cylindrical ring gear and the cylindrical shaft. The intermeshing disconnect mechanism is configured to connect the cylindrical ring gear to the differential case or disconnect the cylindrical ring gear from the differential case. The intermeshing disconnect mechanism is configured to disconnect a power transmission member from the auxiliary drive wheels in a two-wheel drive mode. The power transmission member is configured to transmit driving force to the auxiliary drive wheels in the four-wheel drive mode. The two-wheel drive mode is a mode in which driving force is transmitted from the driving source to the main drive wheels. The actuator is configured to move the intermeshing disconnect mechanism between a connection position and a disconnection position. The cylindrical ring gear is coupled to the cylindrical shaft so as to be relatively non-rotatable at the connection position. Relative rotation between the cylindrical ring gear and the cylindrical shaft is allowed at the disconnection position. The actuator is configured to selectively execute one of the two-wheel drive mode and the four-wheel drive mode.

According to the above aspect, The part of the intermeshing disconnect mechanism is provided between the ring gear and the cylindrical shaft of the differential case of the differential gear unit, and, in a disconnect mode in which the power transmission member is disconnected from the auxiliary drive wheels, the ring gear is disconnected from the differential case by the intermeshing disconnect mechanism. Thus, in the disconnect mode, a fully differential state of the differential gear unit is prevented.

In the above aspect, the separating mechanism may include first teeth, second teeth and a movable meshing member, the first teeth may be provided on the cylindrical ring gear, the second teeth may be configured to engage with the first teeth, the movable meshing member may be provided on an outer periphery of the cylindrical shaft so as to be non-rotatable and to move in a direction of the rotation axis. The actuator may be configured to move the movable meshing member to one of the connection position and the disconnection position by using an electromagnet. According to the above aspect, for example, in comparison with a configuration that a control coupling is provided between the ring gear and the differential gear unit, co-rotation of the cylindrical ring gear as a result of rotation of the differential case of the differential gear unit is prevented in the two-wheel drive mode.

In the above aspect, the actuator may include a spring, a first piston, a second piston, a holder, and a trip mechanism. The spring may be configured to urge the movable meshing member from the disconnection position toward the connection position. The first piston may be configured to be reciprocated by a predetermined stroke by using the electromagnet in the direction of the rotation axis. The second piston may be provided on the cylindrical ring gear so as to relatively rotate. The second piston may be moved by the first piston against an urging force of the spring, The holder may include multi-step latch teeth. The holder may be provided on the cylindrical ring gear so as to be relatively non-rotatable and non-movable in the direction of the rotation axis. The holder may be configured to latch the second piston, moved by the first piston, with any one of the multi-step latch teeth. The trip mechanism may be configured such that the first piston reciprocates for a predetermined number of times thereby the second piston moves the movable meshing member to the disconnection position against the urging force of the spring. The trip mechanism may be configured to unlatch the second piston when the number of times of reciprocating stroke exceeds the predetermined number of times, and the trip mechanism may be configured to allow the movable meshing member to move to the connection position under the urging force of the spring. According to the above aspect, for example, in comparison with a configuration that the movable meshing member is reciprocated by a predetermined stroke by attracting a movable piece by using the electromagnet, it is possible to suitably extend the stroke of the movable meshing member by using the trip mechanism.

In the above aspect, the auxiliary drive wheel-side differential unit may further include a synchronizer. The synchronizer may include a gear-side friction engagement member and a movable-side friction engagement member. The gear-side friction engagement member may be provided on the cylindrical ring gear so as to be relatively non-rotatable. The movable-side friction engagement member may be provided on the cylindrical shaft so as to be relatively non-rotatable and to move in the direction of the rotation axis together with the movable meshing member. The synchronizer may be configured to synchronize rotation of the movable meshing member with rotation of the ring gear by bringing the gear-side friction engagement member into sliding contact with the movable-side friction engagement member when the movable meshing member moves to a side of the connection position that is closest to the disconnection position before movement of the movable meshing member to the connection position. A part of the synchronizer may be arranged on the radially inner side of the cylindrical ring gear. According to the above aspect, because the part of the synchronizer is arranged on the radially inner side of the cylindrical ring gear, it is possible to suitably reduce the size of the auxiliary drive wheel-side differential unit in the direction of the rotation axis of the ring gear.

In the above aspect, the auxiliary drive wheel-side differential unit may further include a ball cam. The ball cam may include a pair of annular members and a spherical rolling element. The pair of annular members may be arranged on top of each other between the electromagnet and the trip mechanism. The spherical rolling element may be sandwiched in a pair of inclined recessed grooves respectively provided on mutually facing surfaces of the pair of annular members. The ball cam may be configured such that the pair of annular members are spaced apart from each other when the pair of annular members relatively rotate. The movable meshing member may be configured to move in the direction of the rotation axis by the ball cam via the trip mechanism when rotation of one of the pair of annular members is suppressed by the electromagnet and then the pair of annular members relatively rotate. According to the above aspect, for example, in comparison with a configuration that the movable meshing member is reciprocated by a predetermined stroke by attracting a movable piece by the electromagnet, it is possible to suitably extend the stroke of the movable meshing member by using the ball cam.

In the above aspect, the power transmission member may be a propeller shaft. A control coupling may be provided in series with the propeller shaft, and the control coupling may be configured to control transmitted torque. According to the above aspect, by controlling torque transmitted by the control coupling, it is possible to control the distribution of torque that is transmitted to the main drive wheels and the auxiliary drive wheels in the four-wheel drive mode. In the above aspect, the cylindrical ring gear may have a shaft portion that protrudes in a cylindrical shape. The shaft portion may be supported by a bearing so as to rotate around the rotation axis.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. In the following embodiment, the drawings are modified or simplified where appropriate, and the scale ratio, shape, and the like, of each portion are not always drawn accurately.

Figure 1:
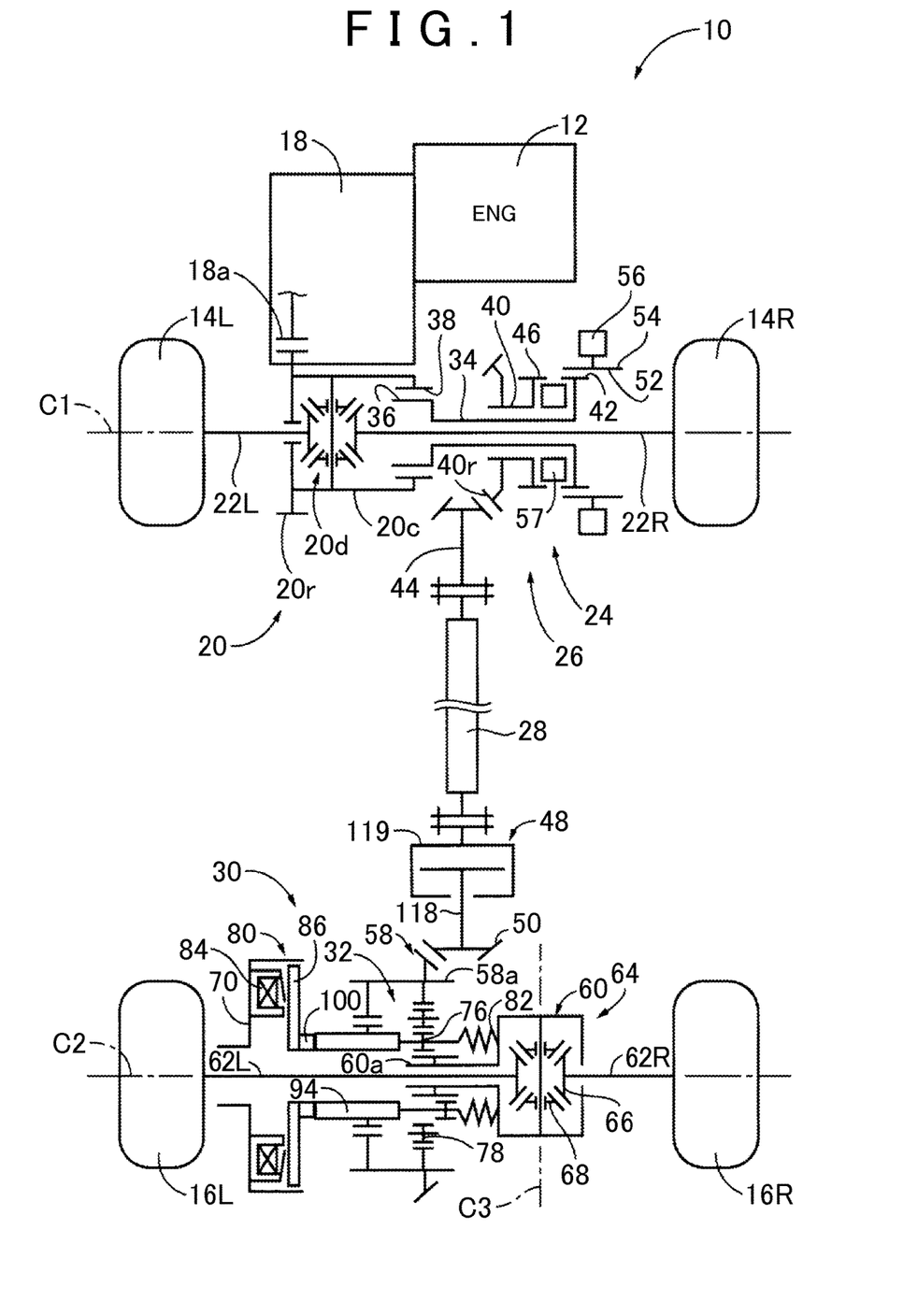
FIG. 1 is a skeletal view that schematically illustrates the configuration of a four-wheel drive vehicle to which the invention is suitably applied.

FIG. 1 is a skeletal view that schematically illustrates the configuration of a four-wheel drive vehicle 10 to which the invention is suitably applied. In FIG. 1, the four-wheel drive vehicle 10 includes an engine 12 as a driving source. The four-wheel drive vehicle 10 includes a four-wheel drive system that includes a first power transmission path and a second power transmission path. The first power transmission path transmits power of the engine 12 to right and left front wheels 14R, 14L (unless specifically distinguished from each other, referred to as front wheels 14) corresponding to main drive wheels. The second power transmission path transmits power of the engine 12 to right and left rear wheels 16R, 16L (unless specifically distinguished from each other, referred to as rear wheels 16) corresponding to auxiliary drive wheels. The four-wheel drive vehicle 10 includes the four-wheel drive system based on an FF system. When the four-wheel drive vehicle 10 is in a two-wheel drive mode, driving force transmitted from the engine 12 via an automatic transmission 18 is transmitted to the right and left front wheels 14R, 14L via a front wheel differential unit 20 and right and left axles 22R, 22L. In the two-wheel drive mode, at least a first clutch 24 is released. Power is not transmitted to a transfer 26, a propeller shaft (power transmission member) 28, a rear wheel differential unit (auxiliary drive wheel-side differential unit) 30 and the rear wheels 16. However, in a four-wheel drive mode, in addition to the two-wheel drive mode, the first clutch 24 and a second clutch 32 both are engaged, and driving force from the engine 12 is transmitted to the transfer 26, the propeller shaft 28, the rear wheel differential unit 30 and the rear wheels 16. Although not shown in FIG. 1, a torque converter or a clutch is provided between the engine 12 and the automatic transmission 18. The torque converter is a fluid transmission device.

The automatic transmission 18 is, for example a stepped automatic transmission. The stepped automatic transmission includes a plurality of planetary gear trains and friction engagement devices (a clutch and a brake). A speed position of the stepped automatic transmission is selected by selectively engaging those friction engagement devices. Alternatively, the automatic transmission 18 may be a stepped automatic transmission in which a speed position of a constant mesh parallel shaft transmission is selected by a shift actuator and a select actuator. Alternatively, the automatic transmission 18 may be a continuously variable transmission of which a speed ratio is continuously changed by changing the effective diameters of a pair of variable pulleys having variable effective diameters and around which a transmission belt is wound. Because the automatic transmission 18 is a known technique, the description of specific structure and operation is omitted.

The front wheel differential unit 20 includes a ring gear 20r, a differential case 20c, and a differential gear mechanism 20d. The ring gear 20r is provided so as to be rotatable around a rotation axis C1, and is in mesh with an output gear 18a of the automatic transmission 18. The differential case 20c is fixed to the ring gear 20r. The differential gear mechanism 20d is accommodated in the differential case 20c. The front wheel differential unit 20 transmits driving force to the right and left axles 22R, 22L of the front wheels 14 while allowing differential rotation between the right and left axles 22R, 22L. Internal teeth 38 are formed on the differential case 20c. The internal teeth 38 are in mesh with external teeth 36. The external teeth 36 are formed at a shaft end of a first rotating member 34 of the transfer 26. Thus, the transfer 26 is coupled to the differential case 20c of the front wheel differential unit 20. The transfer 26 transmits driving force, output from the engine 12, to the rear wheels 16.

The transfer 26 includes the first rotating member 34 and a second rotating member 40. The external teeth 36 are formed on the first rotating member 34. A ring gear 40r is formed on the second rotating member 40. The ring gear 40r is used to transmit power toward the rear wheels 16. Those first rotating member 34 and second rotating member 40 are selectively connected or disconnected by the first clutch 24 formed of a dog clutch.

The first rotating member 34 is a cylindrical member. The axle 22R extends through the radially inner side of the first rotating member 34. The first rotating member 34 is rotatably provided concentrically with the axle 22R and the second rotating member 40. The external teeth 36 are formed at one end of the first rotating member 34 in the axial direction. When the external teeth 36 are fitted to the internal teeth 38 formed on the differential case 20c, the first rotating member 34 rotates integrally with the differential case 20c of the front wheel differential unit 20. Clutch teeth 42 are formed at the other end of the first rotating member 34 in the axial direction. The clutch teeth 42 constitute the first clutch 24.

The second rotating member 40 is a cylindrical member. The axle 22R and the first rotating member 34 extend through the radially inner side of the second rotating member 40. The ring gear 40r is formed at one end of the second rotating member 40 in the axial direction. The ring gear 40r is in mesh with a driven pinion 44. Clutch teeth 46 are formed at the other end of the second rotating member 40 in the axial direction. The clutch teeth 46 constitute the first clutch 24. The driven pinion 44 is connected to the front end of the propeller shaft 28. A drive pinion 50 is provided at the rear end of the propeller shaft 28 via a coupling (control coupling) 48. The coupling 48 is configured to control transmitted torque by an electronic control unit (not shown).

The first clutch 24 is a dog clutch for connecting the first rotating member 34 to the second rotating member 40 or disconnecting the first rotating member 34 from the second rotating member 40. The first clutch 24 is a dog clutch (separating device), and includes a sleeve 54 and a first clutch actuator 56. Internal teeth 52 are formed on the sleeve 54. The internal teeth 52 are constantly in mesh with the clutch teeth 42 so as to relatively move in the rotation axis C1 direction, and are able to further mesh with the clutch teeth 46 when the sleeve 54 is moved in the rotation axis C1 direction. The clutch teeth 42 are formed on the first rotating member 34. The clutch teeth 46 are formed on the second rotating member 40. The first clutch actuator 56 actuates the sleeve 54 in the rotation axis C1 direction between a non-meshing position of the sleeve 54 and a meshing position of the sleeve 54. The first clutch actuator 56 is formed of an electrically controllable actuator including an electromagnet. The first clutch 24 suitably includes a synchronizer 57. The synchronizer 57 reduces a relative rotation difference between the internal teeth 52 and the clutch teeth 46 at the time when the internal teeth 52 mesh with the clutch teeth 46. FIG. 1 shows a state where the first clutch 24 is released.

The rear wheel differential unit 30 includes the second clutch 32 and a differential gear unit 64 in a power transmission path from the propeller shaft 28 to the right and left rear wheels 16R, 16L. The second clutch 32 is a dog clutch (separating device) for connecting the ring gear 58 to the differential case 60 or disconnecting the ring gear 58 from the differential case 60. The ring gear 58 is located between the propeller shaft 28 and the right and left rear wheels 16R, 16L. That is, the ring gear 58 is in mesh with the drive pinion 50 so as to be relatively non-rotatable. When the second clutch 32 is engaged, the differential gear unit 64 distributes driving force to the right and left rear wheels 16R, 16L while allowing differential rotation between the right and left rear wheels 16R, 16L. The driving force is transmitted from the engine 12 to the differential case 60. The differential gear unit 64 includes the differential case 60, a pair of side gears 66, and a pair of pinions 68. The differential case 60 is supported so as to be rotatable around the rotation axis C2. The pair of side gears 66 are respectively coupled to the pair of axles 62R, 62L. The pair of axles 62R, 62L are respectively coupled to the rear wheels 16. The pair of side gears 66 are supported by the differential case 60 so as to be rotatable around the rotation axis C2 in a state where the pair of side gears 66 face each other inside the differential case 60. The pair of pinions 68 are supported by the differential case 60 so as to be rotatable around a rotation axis C3 perpendicular to the rotation axis C2. Because the differential gear unit 64 is a known technique, the description of specific structure and operation is omitted.

Figure 2:
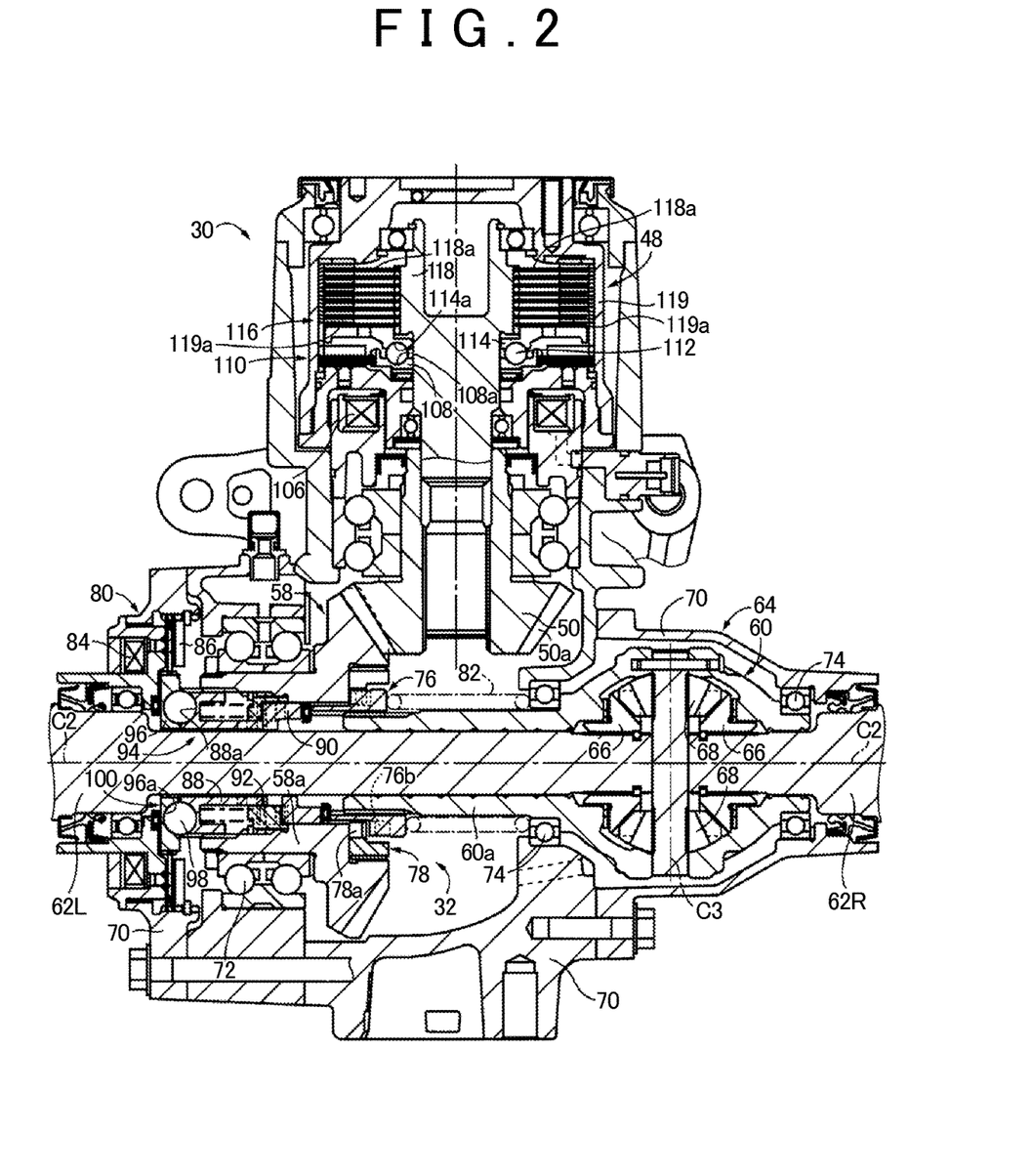
FIG. 2 is a cross-sectional view that illustrates the configuration of an auxiliary drive wheel-side differential unit provided in the four-wheel drive vehicle shown in FIG. 1.
Figure 3:
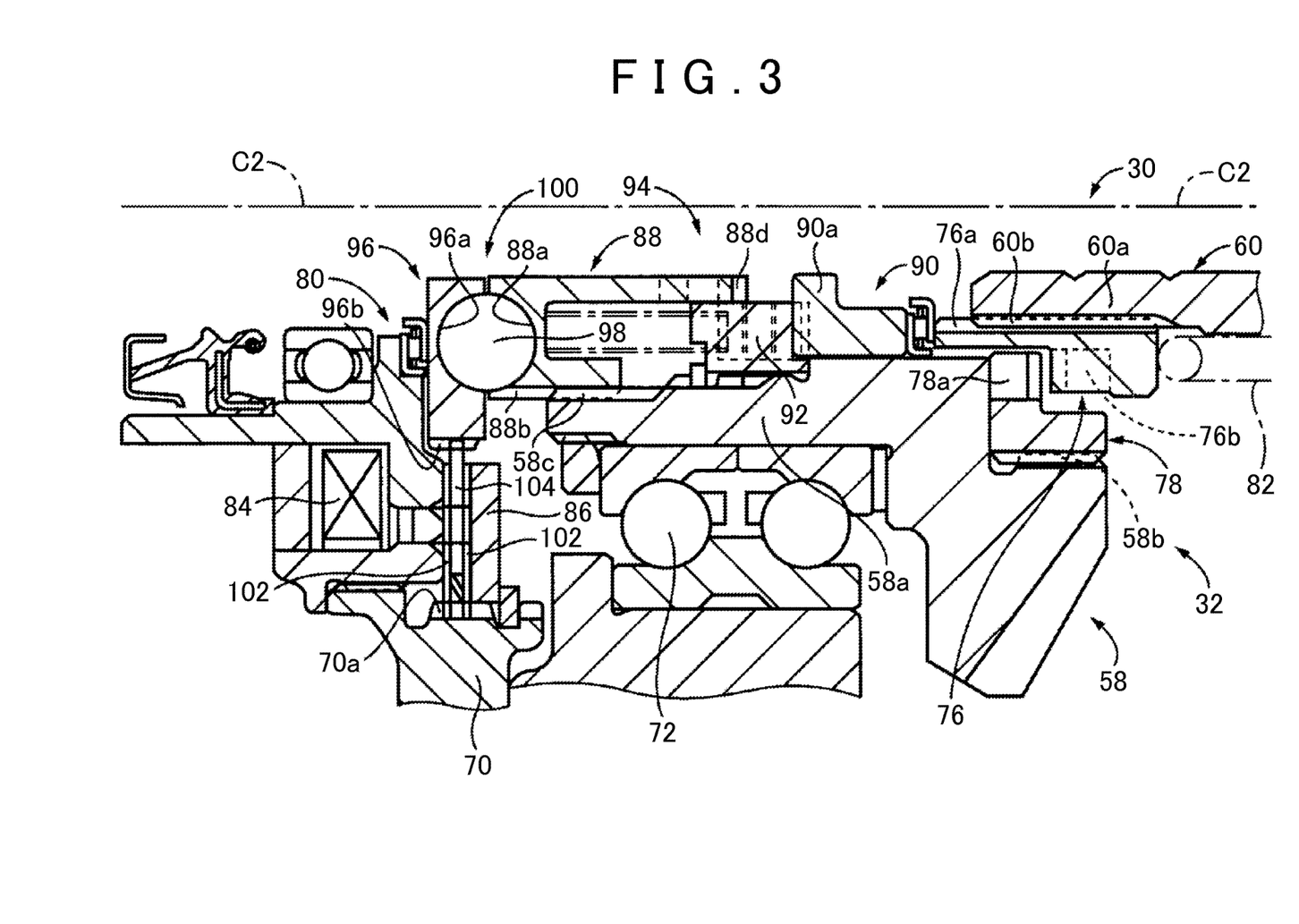
FIG. 3 is an enlarged view of FIG. 2, illustrating an intermeshing disconnect mechanism provided in the auxiliary drive wheel-side differential unit shown in FIG. 2.

As shown in FIG. 2 and FIG. 3, the ring gear 58 is, for example, a bevel gear in which a hypoid gear is formed. The ring gear 58 has a shaft portion 58a. The shaft portion 58a protrudes in a substantially cylindrical shape from the inner peripheral portion of the ring gear 58 toward the rear wheel 16L along the rotation axis C2. The shaft portion 58a of the cylindrical ring gear 58 is supported by a bearing 72 provided in a unit case 70. Thus, the ring gear 58 is supported so as to rotate around the rotation axis C2. As shown in FIG. 2, the differential case 60 has a cylindrical shaft 60a. The cylindrical shaft 60a protrudes in a substantially cylindrical shape from the differential case 60 toward the rear wheel 16L, that is, toward the inside of the cylindrical ring gear 58. The distal end of the cylindrical shaft 60a is arranged inside the cylindrical ring gear 58. The differential case 60 is supported by a pair of bearings 74 provided in the unit case 70. Thus, the cylindrical shaft 60a is supported so as to be pivotable around the rotation axis C2, that is, the cylindrical shaft 60a is supported so as to be rotatable concentrically with the ring gear 58.

The second clutch 32 is a dog clutch for connecting the ring gear 58 to the differential case 60 or disconnecting the ring gear 58 from the differential case 60. As shown in FIG. 2 and FIG. 3, the second clutch 32 is a dog clutch, and includes a movable sleeve (movable meshing member) 76, a second clutch actuator (actuator) 80, and the like. Internal teeth 76a and external teeth (second teeth) 76b are formed on the movable sleeve (movable meshing member) 76. The internal teeth 76a are constantly in mesh with external teeth 60b so as to move in the rotation axis C2 direction. The external teeth 60b are formed on the outer periphery of the distal end of the cylindrical shaft 60a of the differential case 60. The external teeth (second teeth) 76b are able to mesh with internal teeth (first teeth) 58b via the internal teeth 78a of a fixed engagement member 78 when the external teeth 76b are moved in the rotation axis C2 direction. The internal teeth 58b are formed on the inner periphery of the cylindrical ring gear 58. The second clutch actuator (actuator) 80 changes the movable sleeve 76 between a connection position and a disconnection position by moving the movable sleeve 76 in the rotation axis C2 direction. At the connection position, the external teeth 76b of the movable sleeve 76 meshes with the internal teeth 78a of the fixed engagement member 78, with the result that the ring gear 58 is coupled to the cylindrical shaft 60a of the differential case 60 so as to be relatively non-rotatable. At the disconnection position, the external teeth 76b do not mesh with the internal teeth 78a of the fixed engagement member 78, with the result that relative rotation between the ring gear 58 and the cylindrical shaft 60a of the differential case 60 is allowed. In the two-wheel drive mode in which the first clutch 24 is released, the movable sleeve 76 of the second clutch 32 is moved by the second clutch actuator 80 of the second clutch 32 to the disconnection position, and the propeller shaft 28 is disconnected from the rear wheels 16R, 16L, that is, the ring gear 58 is disconnected from the differential case 60. As a result, transmission of rotation from the right and left rear wheels 16R, 16L to the propeller shaft 28, and the like, is suppressed. Thus, the running resistance of the vehicle due to the rotational resistance of the propeller shaft 28, and the like, is reduced. In the present embodiment, the second clutch 32 is an example of a disconnect mechanism, that is, an intermeshing disconnect mechanism. A part of the intermeshing disconnect mechanism, that is, the movable sleeve 76, is arranged between the cylindrical ring gear 58 and the cylindrical shaft 60a of the differential case 60.

The second clutch actuator 80 includes a spring 82. The spring 82 is interposed between the movable sleeve 76 and the rear wheel 16L side bearing 74 of the pair of bearings 74. The spring 82 urges the movable sleeve 76 from the disconnection position toward the connection position. That is, the spring 82 urges the movable sleeve 76 toward the rear wheel 16L in the rotation axis C2 direction. The second clutch actuator 80 includes a first piston 88, a second piston 90, a holder 92, and a ratchet mechanism (trip mechanism) 94. The first piston 88 is reciprocated in the rotation axis C2 direction by a predetermined stroke when an annular electromagnet 84 attracts a disc-shaped movable piece 86. The annular electromagnet 84 is provided in the unit case 70. The second piston 90 is provided on the ring gear 58 so as to be relatively rotatable. The second piston 90 is moved by the first piston 88 in the rotation axis C2 direction against the urging force of the spring 82. The holder 92 has multi-step latch teeth 92a, 92b, 92c. The holder 92 is provided on the ring gear 58 so as to be relatively non-rotatable and movable in the rotation axis C2 direction. The holder 92 latches the second piston 90 moved by the first piston 88 with any one of the multi-step latch teeth 92a, 92b, 92c. In the ratchet mechanism (trip mechanism) 94, the first piston 88 reciprocates for a predetermined number of times thereby the second piston 90 moves the movable sleeve 76 to the disconnection position against the urging force of the spring 82. The ratchet mechanism (trip mechanism) 94 unlatches the second piston 90 when the number of times of reciprocating stroke exceeds the predetermined number of times, and allows the movable sleeve 76 to move to the connection position under the urging force of the spring 82. The second clutch actuator 80 includes a ball cam 100. The ball cam 100 includes the annular first piston 88, an annular support member 96 (the pair of annular members 88, 96), and spherical rolling elements 98. The annular first piston 88 and the annular support member 96 are arranged on top of each other between the ratchet mechanism 94 and the electromagnet 84. The spherical rolling elements 98 are respectively sandwiched in pairs of inclined recessed grooves 88a, 96a respectively formed on mutually opposite faces of the first piston 88 and the support member 96. The ball cam 100 is configured so that the first piston 88 and the support member 96 are spaced apart from each other when the first piston 88 and the support member 96 are relatively rotated. As shown in FIG. 2, the electromagnet 84 of the second clutch actuator 80 is arranged at a side across the ring gear 58 from the differential gear unit 64 in the rear wheel differential unit 30 (the electromagnet 84 of the second clutch actuator 80 is arranged such that the ring gear 58 is located between the differential gear unit 64 and the electromagnet 84 of the second clutch actuator 80).

Thus, when the first piston 88 is reciprocated, for example, about once or twice toward the rear wheel 16R and toward the rear wheel 16L in the rotation axis C2 direction by the ball cam 100, the movable sleeve 76 is moved to the disconnection position via the ratchet mechanism 94 against the urging force of the spring 82. The disconnection position is shown on the lower side of the rotation axis C2 in FIG. 2. As a result, the external teeth 76b of the movable sleeve 76 are disengaged from the internal teeth 78a of the fixed engagement member 78, and the second clutch 32 is released. The internal teeth 78a of the fixed engagement member 78 are engaged with the internal teeth 58b of the ring gear 58 so as to be relatively non-rotatable. When the first piston 88 is reciprocated, for example, about three times by the ball cam 100, that is, when the number of times of reciprocation of the first piston 88 exceeds the predetermined number of times, the second piston 90 is unlatched from the latch teeth 92b of the holder 92 in the ratchet mechanism 94. The movable sleeve 76 is allowed to move to the connection position under the urging force of the spring 82. The connection position is shown on the upper side of the rotation axis C2 in FIG. 2. The external teeth 76b of the movable sleeve 76 are meshed with the internal teeth 78a of the fixed engagement member 78, and the second clutch 32 is engaged. The internal teeth 78a of the fixed engagement member 78 are engaged with the internal teeth 58b of the ring gear 58 so as to be relatively non-rotatable.

As shown in FIG. 3, internal teeth 70a, a pair of disc-shaped friction plates 102, a disc-shaped coupling plate 104 and external teeth 96b are provided between the electromagnet 84 and the ball cam 100. The internal teeth 70a are formed on the inner periphery of the unit case 70, that is, the side facing the electromagnet 84. The pair of disc-shaped friction plates 102 are arranged between the electromagnet 84 and the movable piece 86. The pair of disc-shaped friction plates 102 are engaged with the internal teeth 70a of the unit case 70 so as to be relatively non-rotatable and to move in the rotation axis C2 direction. The disc-shaped coupling plate 104 is arranged between the pair of friction plates 102. The external teeth 96b of the support member 96 are engaged with the coupling plate 104 so as to be relatively non-rotatable and to move in the rotation axis C2 direction. The pairs of inclined recessed grooves 88a, 96a are formed at multiple locations in the circumferential direction between the annular first piston 88 and the annular support member 96. Each of the inclined recessed grooves 88a, 96a is inclined such that the depth of each of the inclined recessed grooves 88a, 96a decreases toward one of two sides in the circumferential direction. Each of the inclined recessed grooves 88a, 96a shown in the cross-sectional view of FIG. 3 shows the deepest point of each of the inclined recessed grooves 88a, 96a. External teeth 88b are formed on the outer periphery at the rear wheel 16L-side end of the first piston 88. The external teeth 88b are in mesh with internal teeth 58c so as to be relatively non-rotatable and to move in the rotation axis C2 direction. The internal teeth 58c are formed on the inner periphery of the distal end of the shaft portion 58a of the ring gear 58.

In the thus configured electromagnet 84 and ball cam 100, for example, when the ring gear 58 is rotating while the vehicle travels, and when the movable piece 86 is attracted by the electromagnet 84, the coupling plate 104 is clamped by the pair of friction plates 102 because of the movable piece 86, and rotation of the coupling plate 104 is suppressed or stopped by the unit case 70. That is, when the movable piece 86 is attracted by the electromagnet 84, rotation of the support member 96 is suppressed or stopped by the unit case 70 via the coupling plate 104. Therefore, relative rotation occurs between the support member 96 and the first piston 88. Thus, the first piston 88 reciprocates toward the rear wheel 16R and toward the rear wheel 16L in the rotation axis C2 direction with respect to the support member 96 via the spherical rolling elements 98. When the movable piece 86 is not attracted by the electromagnet 84, rotation of the support member 96 is not suppressed by the unit case 70. Therefore, the support member 96 co-rotates with the first piston 88 via the spherical rolling elements 98, and relative rotation does not occur anymore between the support member 96 and the first piston 88. Reciprocation of the first piston 88 in the rotation axis C2 direction stops.

Figure 4:
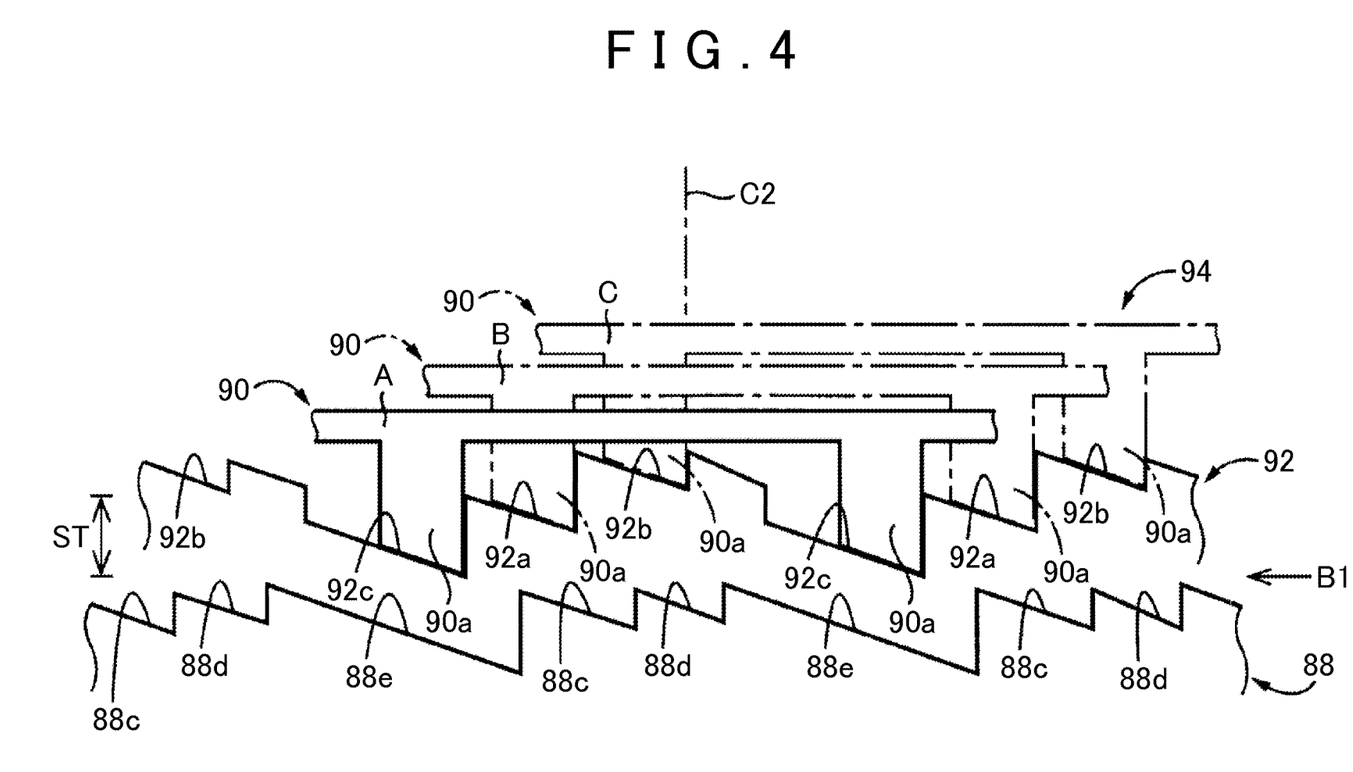
FIG. 4 is a detailed view that illustrates a trip mechanism provided in the intermeshing disconnect mechanism shown in FIG. 3.

FIG. 4 is a schematic view that illustrates the operation principle of an example of the ratchet mechanism 94. FIG. 4 shows the annular first piston 88, the annular second piston 90 and the annular holder 92 in developed view. The ratchet mechanism 94 functions as a trip mechanism. The ratchet mechanism 94 includes the holder 92 and the first piston 88. The holder 92 has multi-step sawteeth for latching protrusions 90a. The holder 92 is fixed to the ring gear 58. The protrusions 90a protrude from the second piston 90 toward the holder 92. The multi-step sawteeth are continuous in the circumferential direction, and are periodically formed latch teeth 92a, 92b, 92c. The first piston 88 is provided so as to be relatively non-rotatable and to relatively move in the rotation axis C2 direction with respect to the holder 92. The first piston 88 periodically has receiving teeth 88c, 88d, 88e. The receiving teeth 88c, 88d, 88e have similar sawtooth shapes to those of the latch teeth 92a, 92b, 92c of the holder 92. The receiving teeth 88c, 88d, 88e are continuous in the circumferential direction so as to be shifted by a half phase in the circumferential direction with respect to the latch teeth 92a, 92b, 92c. The receiving teeth 88c, 88d, 88e receive the protrusions 90a of the second piston 90. The first piston 88 moves the second piston 90 by one stroke of the ball cam 100 against the urging force of the spring 82. The sets of three latch teeth 92a, 92b, 92c having different heights in the holder 92 are formed so as to be close to the second piston 90 side at a distance shorter than or equal to one stroke of the ball cam 100. The sets of three receiving teeth 88c, 88d, 88e having different heights in the first piston 88 are respectively formed in similar shapes to those of the latch teeth 92a, 92b, 92c. The sets of receiving teeth 88c, 88d, 88e are located so as to be shifted by a half phase in the circumferential direction with respect to the latch teeth 92a, 92b, 92c. In FIG. 4, the first piston 88 and the holder 92 are intentionally shifted in the rotation axis C2 direction for the sake of easy understanding. In an initial state, the inclined faces of the receiving teeth 88e are substantially flush with the inclined faces of the latch teeth 92c. In the initial state, the protrusions 90a extending from the second piston 90 are located at a position A at which the protrusions 90a are latched to the latch teeth 92c when the movable sleeve 76 is located at the connection position. A stroke ST of the first piston 88 is indicated as a stroke from a base position B1 that is the lower end of the inclined face of each of the latch teeth 92c.

In the initial state of the movable sleeve 76, when the first piston 88 is reciprocated by the stroke ST by using the electromagnet 84 for the first time, the protrusions 90a of the second piston 90 move as a result of movement of the receiving teeth 88e of the first piston 88. Thus, each protrusion 90a of the second piston 90 crosses over the distal end of a corresponding one of the latch teeth 92a against the urging force of the spring 82, slides onto the lowest end of the inclined face of the corresponding one of the latch teeth 92a, and is latched to a position B. Subsequently, when the first piston 88 is reciprocated by the stroke ST by using the electromagnet 84 for the second time, the protrusions 90a of the second piston 90 move as a result of movement of the receiving teeth 88c of the first piston 88. Thus, each protrusion 90a crosses over the distal end of a corresponding one of the latch teeth 92b against the urging force of the spring 82, slide onto the lowest end of the inclined face of the corresponding one of the latch teeth 92b, and is latched to a position C. Subsequently, when the first piston 88 is reciprocated by the stroke ST by using the electromagnet 84 for the third time, the protrusions 90a of the second piston 90 move as a result of movement of the receiving teeth 88d of the first piston 88. Thus, each protrusion 90a crosses over the distal end of a corresponding one of the latch teeth 92c against the urging force of the spring 82, slides onto the lowest end of the inclined face of the corresponding one of the latch teeth 92c, and is latched to the corresponding one of the latch teeth 92c. Thus, each protrusion 90a is returned to the same initial state as the position A. That is, when the first piston 88 is reciprocated by the electromagnet 84 via the ball cam 100 for the third time that corresponds to the predetermined number of times, the movable sleeve 76 is returned to the connection position. Thus, the external teeth 76b of the movable sleeve 76 are engaged with the internal teeth 78a of the fixed engagement member 78, and the second clutch 32 is engaged. The internal teeth 78a of the fixed engagement member 78 are engaged with the internal teeth 58b of the ring gear 58 so as to be relatively non-rotatable.

Thus, the ratchet mechanism 94 sequentially moves the second piston 90 toward the disconnection position while shifting the second piston 90 in the circumferential direction one by one by a reciprocation of the first piston 88 by using the ball cam 100. When the number of times of movement of the second piston 90 reaches the predetermined number of times, the second piston 90 returns to the disconnection position. That is, in the ratchet mechanism 94, when the number of times of movement of the second piston 90 exceeds the predetermined number of times, the second piston 90 is unlatched from the latch teeth 92b of the holder 92, and the movable sleeve 76 is allowed to move toward the connection position under the urging force of the spring 82.

As shown in FIG. 2, the coupling 48 includes an annular electromagnet 106, an auxiliary friction engagement device 110, a main pressing member 114 and a main friction engagement device 116. The annular electromagnet 106 is fixed to the unit case 70 that is a non-rotating member. The auxiliary friction engagement device 110 generates friction torque in an auxiliary pressing member 108 by magnetic force that is generated in the electromagnet 106. The main pressing member 114 sandwiches spherical rolling elements 112 in inclined recessed grooves 108a, 114a with the auxiliary pressing member 108. The main friction engagement device 116 generates friction torque upon reception of thrust that is generated by relative rotation of the auxiliary pressing member 108 with respect to the main pressing member 114. The main friction engagement device 116 includes a clutch hub 118, a clutch drum 119, hub-side friction plates 118a and drum-side friction plates 119a. The clutch hub 118 is coupled to the drive pinion 50 so as to be relatively non-rotatable. The clutch drum 119 is coupled to the propeller shaft 28 so as to be relatively non-rotatable. The hub-side friction plates 118a and the drum-side friction plates 119a are respectively mounted on the clutch hub 118 and the clutch drum 119 so as to be relatively non-rotatable, and are alternately stacked on top of each other. Thus, the coupling 48 transmits torque based on an exciting current (torque command value) to the ring gear 58, that is, the rear wheels 16. The exciting current (torque command value) is supplied from an electronic control unit (not shown) to the electromagnet 106. That is, by controlling the torque transmitted by the coupling 48, it is possible to continuously change the distribution of torque between the front and rear wheels within the range of 100:0 to 50:50. The coupling 48 is provided in series with the propeller shaft 28.

In the thus configured four-wheel drive vehicle 10, for example, in the four-wheel drive mode in which both the first clutch 24 and the second clutch 32 are engaged, when the electronic control unit (not shown) selects a two-wheel drive traveling mode, the sleeve 54 is moved to the non-meshing position by the first clutch actuator 56, with the result that the first clutch 24 is released. The movable sleeve 76 is moved to the disconnection position by the second clutch actuator 80, and the second clutch 32 is released. Therefore, the vehicle is in the two-wheel drive mode in which driving force is transmitted from the engine 12 to only the front wheels 14 that are the main drive wheels. In the two-wheel drive mode in which both the first clutch 24 and the second clutch 32 are released, when the electronic control unit (not shown) selects a four-wheel drive traveling mode, the sleeve 54 is moved to the meshing position by the first clutch actuator 56, with the result that the first clutch 24 is engaged. The movable sleeve 76 is moved to the connection position by the second clutch actuator 80, with the result that the second clutch 32 is engaged. Thus, the vehicle is in the four-wheel drive mode in which driving force is transmitted from the engine 12 to the front wheels 14 and the rear wheels 16. The timing at which the first clutch 24 is engaged and the timing at which the second clutch 32 is engaged may be the same. The timing at which the first clutch 24 is engaged may be earlier than the timing at which the second clutch 32 is engaged. Alternatively, the timing at which the second clutch 32 is engaged may be earlier than the timing at which the first clutch 24 is engaged.

As described above, with the rear wheel differential unit 30 of the four-wheel drive vehicle 10 according to the present embodiment, the movable sleeve 76 of the second clutch 32 is provided between the cylindrical ring gear 58 and the cylindrical shaft 60a of the differential case 60 of the differential gear unit 64. When the propeller shaft 28 is disconnected from the rear wheels 16 in the two-wheel drive mode, the ring gear 58 is disconnected from the differential case 60 by the movable sleeve 76 of the second clutch 32. Thus, in the disconnected state, a fully differential state of the differential gear unit 64 is prevented.

With the rear wheel differential unit 30 of the four-wheel drive vehicle 10 according to the present embodiment, the second clutch 32 includes the internal teeth 58b, the external teeth 76b and the movable sleeve 76. The internal teeth 58b are formed on the ring gear 58. The external teeth 76b are engageable with the internal teeth 58b via the fixed engagement member 78. The movable sleeve 76 is provided on the outer periphery of the cylindrical shaft 60a of the differential case 60 so as to be relatively non-rotatable and to move in the rotation axis C2 direction. The second clutch actuator 80 moves the movable sleeve 76 to the connection position or to the disconnection position by the electromagnet 84. Therefore, for example, in comparison with the configuration that a control coupling is provided between the ring gear 58 and the differential gear unit 64, co-rotation of the ring gear 58 as a result of rotation of the differential case 60 of the differential gear unit 64 is prevented in the two-wheel drive mode.

With the rear wheel differential unit 30 of the four-wheel drive vehicle 10 according to the present embodiment, the second clutch actuator 80 includes the spring 82, the first piston 88, the second piston 90, the holder 92, and the ratchet mechanism 94. The spring 82 urges the movable sleeve 76 from the disconnection position toward the connection position. The first piston 88 is reciprocated in the rotation axis C2 direction by the predetermined stroke by using the electromagnet 84. The second piston 90 is provided so as to be relatively rotatable with respect to the ring gear 58, and is moved by the first piston 88 against the urging force of the spring 82. The holder 92 has multi-step latch teeth 92a, 92b, 92c. The holder 92 is provided so as to be relatively non-rotatable and non-movable in the rotation axis C2 direction with respect to the ring gear 58. The second piston 90 moved by the first piston 88 is latched by any one set of the multi-step latch teeth 92a, 92b, 92c. The first piston 88 reciprocates for a predetermined number of times thereby the ratchet mechanism 94 causes the second piston 90 to move the movable sleeve 76 to the disconnection position against the urging force of the spring 82, and, when the number of times of reciprocating stroke exceeds the predetermined number of times, unlatches the second piston 90 and allows the movable sleeve 76 to move to the connection position under the urging force of the spring 82. Therefore, for example, in comparison with the configuration that the movable sleeve 76 is reciprocated by the predetermined stroke by attracting the movable piece 86 with the use of the electromagnet 84, it is possible to suitably extend the stroke of the movable sleeve 76 by using the ratchet mechanism 94.

With the rear wheel differential unit 30 of the four-wheel drive vehicle 10 according to the present embodiment, the ball cam 100 is arranged between the electromagnet 84 and the ratchet mechanism 94. The ball cam 100 includes the annular first piston 88, the annular support member 96 and the spherical rolling elements 98. The annular first piston 88 and the annular support member 96 are arranged on top of each other. The spherical rolling elements 98 are sandwiched in the pairs of inclined recessed grooves 88a, 96a respectively formed on mutually opposite faces of the first piston 88 and support member 96. When the first piston 88 and the support member 96 are rotated relatively, the first piston 88 is spaced apart from the support member 96. When rotation of the support member 96 is suppressed by the electromagnet 84 and then the first piston 88 and the support member 96 relatively rotate, the movable sleeve 76 is moved by the ball cam 100 via the ratchet mechanism 94 in the rotation axis C2 direction. Therefore, for example, in comparison with the configuration that the movable sleeve 76 is reciprocated by the predetermined stroke by attracting the movable piece 86 with the use of the electromagnet 84, it is possible to suitably extend the stroke of the movable sleeve 76 by using the ball cam 100.

With the rear wheel differential unit 30 of the four-wheel drive vehicle 10 according to the present embodiment, the coupling 48 is provided in series with the propeller shaft 28. The propeller shaft 28 is the power transmission member that transmits driving force of the engine 12 to the rear wheels 16 in the four-wheel drive mode. The coupling 48 is able to control transmitted torque. Therefore, by controlling the torque transmitted by the coupling 48, it is possible to control the distribution of transmitted torque between the front wheels 14 and the rear wheels 16 in the four-wheel drive mode.

Next, another embodiment of the invention will be described in detail with reference to the accompanying drawings. In the following description, like reference numerals denote portions common to the above-described embodiment, and the description thereof is omitted.

Figure 5:
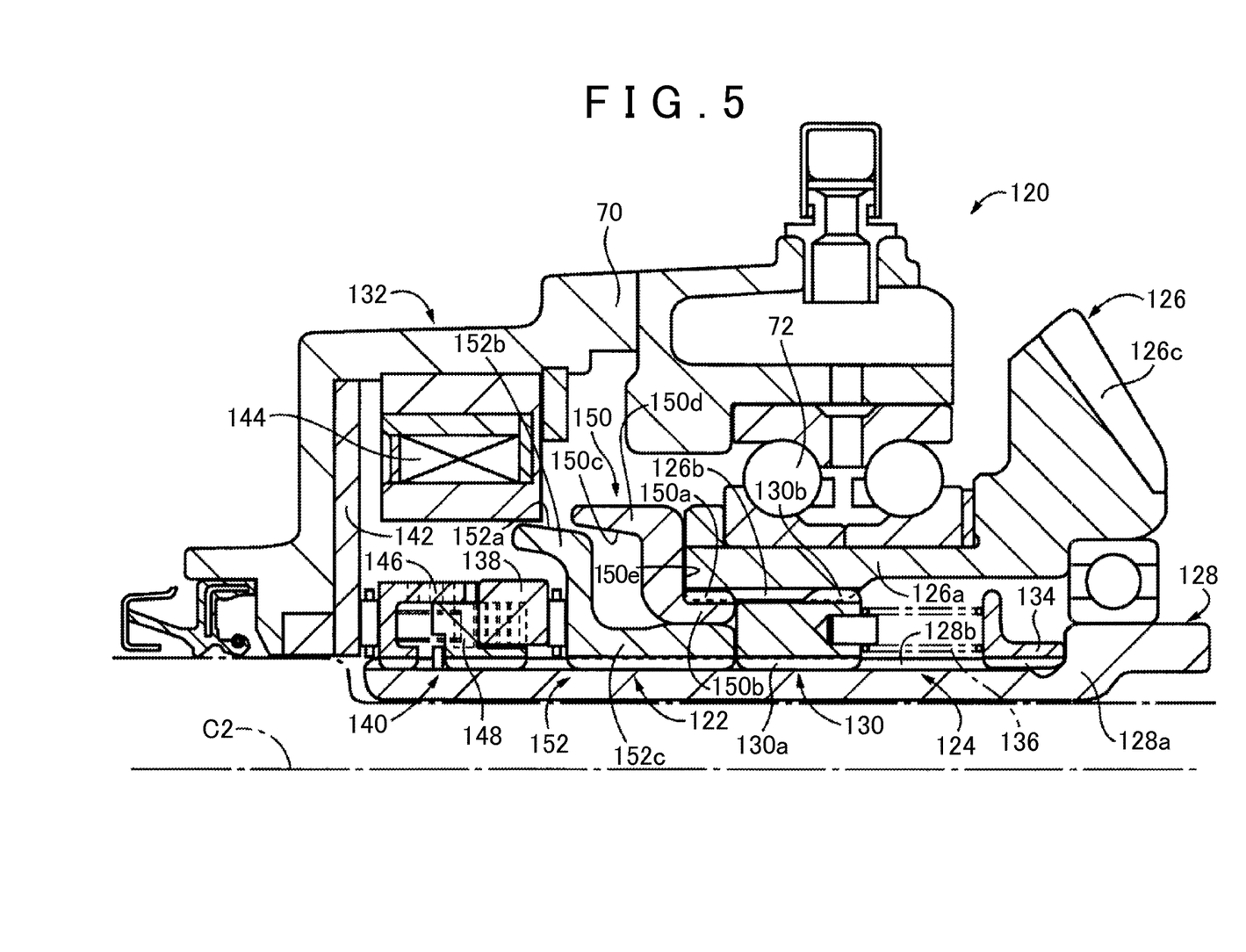
FIG. 5 is a cross-sectional view that illustrates another embodiment of the invention and that corresponds to FIG. 3.

A rear wheel differential unit 120 for a four-wheel drive vehicle according to the present embodiment differs from the rear wheel differential unit 30 according to the first embodiment in that a second clutch 124 including a synchronizer 122 is used instead of the second clutch 32 according to the above-described first embodiment as shown in FIG. 5. The rear wheel differential unit 120 according to the present embodiment also differs from the rear wheel differential unit 30 according to the first embodiment in that a cylindrical ring gear 126 having a different shape from the shape of the cylindrical ring gear 58 according to the first embodiment is used. The rear wheel differential unit 120 according to the present embodiment further differs from the rear wheel differential unit 30 according to the first embodiment in that a differential case 128 including a cylindrical shaft 128a having a different shape from the shape of the cylindrical shaft 60a of the differential case 60 according to the first embodiment is used. The other points are substantially the same.

As shown in FIG. 5, the ring gear 126 is, for example, a bevel gear in which a hypoid gear is formed. The ring gear 126 has the shaft portion 126a. The shaft portion 126a protrudes in a substantially cylindrical shape from the inner peripheral portion of the ring gear 126 toward the rear wheel 16L. As shown in FIG. 5, the differential case 128 has the cylindrical shaft 128a. The cylindrical shaft 128a protrudes in a substantially cylindrical shape from the differential case 128 toward the rear wheel 16L, that is, toward the inside of the ring gear 126. The cylindrical shaft 128a extends through the inside of the cylindrical ring gear 126. The ring gear 126 and the differential case 128, as in the case of the above-described first embodiment, are supported in the unit case 70 so as to pivot around the rotation axis C2.

The second clutch 124, as well as the second clutch 32 according to the above-described first embodiment, is a dog clutch for connecting the ring gear 126 to the differential case 128 or disconnecting the ring gear 126 from the differential case 128. As shown in FIG. 5, the second clutch 32 includes internal teeth 130a, external teeth (second teeth) 130b, a movable sleeve (movable meshing member) 130, a second clutch actuator (actuator) 132, and the like. External teeth (second teeth) 130b are formed on the movable sleeve (movable meshing member) 130. The second clutch 32 is a dog clutch. The internal teeth 130a are constantly in mesh with external teeth 128b so as to relatively move in the rotation axis C2 direction. The external teeth 128b are formed on the outer periphery of the cylindrical shaft 128a of the differential case 128. The external teeth (second teeth) 130b meshes with the internal teeth (first teeth) 126b as a result of movement of the external teeth 130b in the rotation axis C2 direction. The internal teeth (first teeth) 126b are formed on the inner periphery of the shaft portion 126a of the ring gear 126. The second clutch actuator (actuator) 132 moves the movable sleeve 130 to a connection position or a disconnection position in the rotation axis C2 direction. At the connection position, the external teeth 130b mesh with the internal teeth 126b of the ring gear 126, with the result that the ring gear 126 is coupled to the differential case 128 so as to be relatively non-rotatable. At the disconnection position, the external teeth 130b do not mesh with the internal teeth 126b of the ring gear 126, with the result that relative rotation between the ring gear 126 and the differential case 128 is allowed. In the present embodiment, the second clutch 124 is an example of the intermeshing disconnect mechanism as in the case of the first embodiment.

The second clutch actuator 132 includes a spring 136, a second piston 138 and an electromagnet 144. The spring 136 is interposed between the movable sleeve 130 and an annular spring bearing member 134. The spring bearing member 134 is engaged with the external teeth 128b of the cylindrical shaft 128a of the differential case 128 so as to be relatively non-rotatable. The spring 136 urges the movable sleeve 130 from the disconnection position toward the connection position in the rotation axis C2 direction. The second piston 138 actuates the movable sleeve 130 toward the disconnection position against the urging force of the spring 136. The electromagnet 144 is provided around the cylindrical shaft 128a of the differential case 128. The electromagnet 144 magnetically attracts a disc-shaped movable piece 142 in order to actuate the second piston 138 via a ratchet mechanism (trip mechanism) 140. As shown in FIG. 5, the electromagnet 144 of the second clutch actuator 132 is arranged at a side across the ring gear 126 from the differential gear unit 64. That is, the ring gear 126 is arranged between the electromagnet 144 of the second clutch actuator 132 and the differential gear unit 64.

Thus, when attraction operation of the movable piece 142 is successively carried out by the electromagnet 144, for a predetermined number of times, for example, about three to five times, the second piston 138 sequentially moves the movable sleeve 130 toward the disconnection position. That is, the second piston 138 sequentially moves the movable sleeve 130 toward the rear wheel 16R. Thus, the external teeth 130b of the movable sleeve 130 are disengaged from the internal teeth 126b of the ring gear 126, and the second clutch 124 is released. When the number of times of attraction operation of the movable piece 142 by using the electromagnet 144 exceeds the predetermined number of times, the second piston 138 and the movable sleeve 130 are allowed to move to the connection position under the urging force of the spring 136. The connection position is shown on the upper side of the rotation axis C2 in FIG. 5. Thus, the external teeth 130b of the movable sleeve 130 are engaged with the internal teeth 126b of the ring gear 126, and the second clutch 124 is engaged. As shown in FIG. 5, the second piston 138, a first piston 146 and a holder 148 that constitute the ratchet mechanism 140 differ in shape from the second piston 90, the first piston 88 and the holder 92 described in the first embodiment. However, the second piston 138, the first piston 146 and the holder 148 respectively have the same functions as the first piston 88, the second piston 90 and the holder 92. Therefore, in the present embodiment, the description of the operation principle of the ratchet mechanism 140 is omitted.

The second clutch actuator 132 includes a gear-side friction engagement member 150, a movable-side friction engagement member 152, and the synchronizer 122. The gear-side friction engagement member 150 is provided on the ring gear 126 so as to be relatively non-rotatable. The movable-side friction engagement member 152 is provided on the cylindrical shaft 128a of the differential case 128 so as to be relatively non-rotatable and to move in the rotation axis C2 direction together with the movable sleeve 130. The synchronizer 122 synchronizes rotation of the movable sleeve 130 with rotation of the ring gear 126 as a result of bringing the gear-side friction engagement member 150 into sliding contact with the movable-side friction engagement member 152 when the movable sleeve 130 moves to a side of the connection position which is closest to the disconnection position before movement of the movable sleeve 130 to the connection position.

As shown in FIG. 5, the gear-side friction engagement member 150 has a small-diameter cylindrical portion 150b and a large-diameter cylindrical portion 150d. External teeth 150a are formed on the small-diameter cylindrical portion 150b. The external teeth 150a are engaged with the internal teeth 126b of the ring gear 126 so as to be relatively non-rotatable. A conical internal friction face 150c is formed on the large-diameter cylindrical portion 150d. The conical internal friction face 150c has a diameter larger than the inside diameter of the ring gear 126, and has a smaller diameter than external teeth 126c of the ring gear 126. The conical internal friction face 150c is slightly inclined with respect to the rotation axis C2. The external teeth 126c are engaged with the drive pinion 50 so as to be relatively non-rotatable. In a state where a step face 150e of the large-diameter cylindrical portion 150d is in contact with the shaft portion 126a of the ring gear 126, the small-diameter cylindrical portion 150b is fitted in the shaft portion 126a of the ring gear 126 so as to be relatively non-rotatable. The movable-side friction engagement member 152 has a large-diameter cylindrical portion 152b and a cylindrical small-diameter cylindrical portion 152c. A conical external friction face 152a is formed on the large-diameter cylindrical portion 152b. The conical external friction face 152a is able to be in sliding contact with the conical internal friction face 150c. The cylindrical small-diameter cylindrical portion 152c has a diameter smaller than the inside diameter of the small-diameter cylindrical portion 150b of the gear-side friction engagement member 150. The cylindrical small-diameter cylindrical portion 152c is engaged with the external teeth 128b so as to be relatively non-rotatable and movable in the rotation axis C2 direction. The external teeth 128b are formed on the cylindrical shaft 128a of the differential case 128.

Therefore, when the movable sleeve 130 is moved from the disconnection position to the connection position via the ratchet mechanism 140, the conical external friction face 152a of the movable-side friction engagement member 152 is connected to the conical internal friction face 150c of the gear-side friction engagement member 150 so as to slide on the conical internal friction face 150c before the internal teeth 126b of the ring gear 126 mesh with the external teeth 130b of the movable sleeve 130. Thus, rotation of the ring gear 126 that is engaged with the gear-side friction engagement member 150 so as to be relatively non-rotatable is synchronized with rotation of the differential case 128 that is engaged with the movable-side friction engagement member 152 so as to be relatively non-rotatable. The positions, shapes and dimensions of those gear-side friction engagement member 150 and movable-side friction engagement member 152 are set such that, when the second piston 138 and the movable sleeve 130 are moved toward a side closest to the ring gear 126 in process in which the number of times of attraction operation of the movable piece 142 by using the electromagnet 144 exceeds the predetermined number of times, the conical internal friction face 150c and the conical external friction face 152a are connected to each other so as to slide on each other. A part of the synchronizer 122, that is, the part of the gear-side friction engagement member 150 and movable-side friction engagement member 152, is arranged on the radially inner side of the cylindrical ring gear 126.

As described above, the rear wheel differential unit 120 for a four-wheel drive vehicle according to the present embodiment includes the synchronizer 122. The synchronizer 122 includes the gear-side friction engagement member 150 and the movable-side friction engagement member 152. The gear-side friction engagement member 150 is provided on the ring gear 126 so as to be relatively non-rotatable. The movable-side friction engagement member 152 is provided on the cylindrical shaft 128*a* of the differential case 128 so as to be relatively non-rotatable and to move in the rotation axis C2 direction together with the movable sleeve 130. The synchronizer 122 synchronizes rotation of the movable sleeve 130 with rotation of the ring gear 126 by bringing the gear-side friction engagement member 150 into sliding contact with the movable-side friction engagement member 152 when the movable sleeve 130 moves to a side of the connection position which is closest to the disconnection position before movement of the movable sleeve 130 to the connection position. A part of the synchronizer 122 is arranged on the radially inner side of the cylindrical ring gear 126. Because the part of the synchronizer 122 is arranged on the radially inner side of the cylindrical ring gear 126, it is possible to suitably reduce the size of the rear wheel differential unit 120 in the rotation axis C2 direction of the ring gear 126.

The embodiments of the invention are described in detail above with reference to the accompanying drawings. The invention is also applied to other embodiments.

For example, the four-wheel drive vehicle 10 according to the above-described embodiments is an FF-base vehicle including the rear wheel differential unit 30 or the rear wheel differential unit 120. The invention is also applicable to an FR-base four-wheel drive vehicle, an RR-base four-wheel drive vehicle, or the like, as needed. In the FR-base four-wheel drive vehicle or the RR-base four-wheel drive vehicle, an auxiliary drive wheel-side differential unit having a similar configuration to that of the rear wheel differential unit 30 or the rear wheel differential unit 120 is used for the front wheels.

In the four-wheel drive vehicle 10 according to the above-described embodiment, the second clutch actuator 80 for operating the second clutch 32 includes the electromagnet 84, the ball cam 100 and the ratchet mechanism 94. The ball cam 100 and the ratchet mechanism 94 are used to operate the second piston 90 by a stroke larger than the operation stroke of the movable piece 86 by the electromagnet 84. Instead, an electromagnetic actuator having a large operation stroke, a motor, a hydraulic cylinder, or the like, may be used to move the second piston 90. In this case, the ball cam 100 and the ratchet mechanism 94 are unnecessary. In the ratchet mechanism 94, the number of steps of the receiving teeth 88*c*, 88*d*, 88*e* of the first piston 88 and the number of steps of the latch teeth 92*a*, 92*b*, 92*c* of the holder 92 each are three. The number of steps of those teeth may be, for example, two or four or more.

In the four-wheel drive vehicle 10 according to the above-described embodiments, the propeller shaft 28 is illustrated as the power transmission member that transmits driving force to the rear wheels 16 that are the auxiliary drive wheels. The power transmission member is not limited to only the propeller shaft 28. The power transmission member may be, for example, a member between the first clutch 24 and the second clutch 32 in the power transmission path that transmits power of the engine 12 to the rear wheels 16. That is, the power transmission member may be the driven pinion 44, the coupling 48, the drive pinion 50, the ring gear 58, or the like.

The above-described embodiments are only illustrative. The invention may be implemented in a mode including various modifications or improvements on the basis of the knowledge of persons skilled in the art.

What is claimed is:

1. An auxiliary drive wheel-side differential unit for a four-wheel drive vehicle, the four-wheel drive vehicle including a driving source, main drive wheels, and auxiliary drive wheels, the auxiliary drive wheel-side differential unit comprising:

a cylindrical ring gear supported so as to rotate around a rotation axis of the cylindrical ring gear, the cylindrical ring gear being configured such that driving force is input to the cylindrical ring gear in a four-wheel drive mode, the four-wheel drive mode being a mode in which driving force is transmitted from the driving source to the main drive wheels and the auxiliary drive wheels, the cylindrical ring gear includes first teeth;

a differential gear unit including a differential case, the differential gear unit being configured to distribute power to the auxiliary drive wheels, the power being transmitted to the differential case, the differential case including a cylindrical shaft concentric with the cylindrical ring gear, the cylindrical shaft protruding toward a radially inner side of the cylindrical ring gear;

a moveable meshing member provided on an outer periphery of the cylindrical shaft so as to be between the cylindrical ring gear and the cylindrical shaft, the moveable meshing member includes second teeth configured to engage with the first teeth of the cylindrical ring gear, the moveable meshing member is provided so as to be non-rotatable with respect to the cylindrical shaft and to move in a direction of the rotation axis, the moveable meshing member being configured to connect the cylindrical ring gear to the differential case or disconnect the cylindrical ring gear from the differential case, the moveable meshing member being configured to disconnect a power transmission member from the auxiliary drive wheels in a two-wheel drive mode, the power transmission member being configured to transmit driving force to the auxiliary drive wheels in the four-wheel drive mode, the two-wheel drive mode being a mode in which driving force is transmitted from the driving source to the main drive wheels; and an actuator configured to (a) move the moveable meshing member between a connection position and a disconnection position, the cylindrical ring gear being coupled to the cylindrical shaft so as to be relatively non-rotatable at the connection position, relative rotation between the cylindrical ring gear and the cylindrical shaft being allowed at the disconnection position, and (b) selectively execute one of the two-wheel drive mode and the four-wheel drive mode, wherein the actuator includes (i) a spring configured to urge the movable meshing member from the disconnection position toward the connection position, (ii) a first piston configured to be reciprocated by a predetermined stroke by using an electromagnet in the direction of the rotation axis, (iii) a second piston provided on the cylindrical ring gear so as to relatively rotate, the second piston being configured to be moved by the first piston against an urging force of the spring, (iv) a holder including multi-step latch teeth, the holder being provided on the cylindrical ring gear so as to be relatively non-rotatable and non-movable in the direction of the rotation axis, the holder being configured to latch the second piston moved by the first piston with any one of the multi-step latch teeth, and (v) a ratchet mechanism configured such that the first piston reciprocates for a predetermined number of times thereby the second piston moves the movable meshing member to the disconnection position against the urging force of the spring, the ratchet mechanism being configured to unlatch the second piston when the number of times of reciprocating stroke exceeds the predetermined number of times, the ratchet mechanism being configured to allow the movable meshing member to move to the connection position under the urging force of the spring.

2. The auxiliary drive wheel-side differential unit according to claim 1, further comprising:

a synchronizer including a gear-side friction engagement member and a movable-side friction engagement member, the gear-side friction engagement member being provided on the cylindrical ring gear so as to be relatively non-rotatable, the movable-side friction engagement member provided on the cylindrical shaft so as to be relatively non-rotatable and to move in the direction of the rotation axis together with the movable meshing member, wherein the synchronizer is configured to synchronize rotation of the movable meshing member with rotation of the cylindrical ring gear by bringing the gear-side friction engagement member into sliding contact with the movable-side friction engagement member when the movable meshing member moves to a side of the connection position that is closest to the disconnection position before movement of the movable meshing member to the connection position, and a part of the synchronizer is arranged on the radially inner side of the cylindrical ring gear.

3. The auxiliary drive wheel-side differential unit according to claim 1, further comprising:

a ball cam including a pair of annular members and a spherical rolling element, the pair of annular members being arranged on top of each other between the electromagnet and the ratchet mechanism, the spherical rolling element being sandwiched in a pair of inclined recessed grooves respectively provided on mutually facing surfaces of the pair of annular members, wherein the ball cam is configured such that the pair of annular members are spaced apart from each other when the pair of annular members relatively rotate, and the movable meshing member is configured to move in the direction of the rotation axis by the ball cam via the ratchet mechanism when rotation of one of the pair of annular members is suppressed by the electromagnet and then the pair of annular members relatively rotate.

4. The auxiliary drive wheel-side differential unit according to claim 1, wherein the power transmission member is a propeller shaft, a control coupling is provided in series with the propeller shaft, and the control coupling is configured to control transmitted torque.

5. The auxiliary drive wheel-side differential unit according to claim 1, wherein the cylindrical ring gear includes a shaft portion that protrudes in a cylindrical shape, and the shaft portion is supported by a bearing so as to rotate around the rotation axis.

* * * * *